(12) United States Patent
Chen et al.

(10) Patent No.: US 9,531,255 B2
(45) Date of Patent: Dec. 27, 2016

(54) LOW-COST DRIVER CIRCUIT WITH IMPROVED POWER FACTOR

(71) Applicants: Timothy Chen, Aurora, OH (US); Daniel Albert Haas, Rootstown, OH (US)

(72) Inventors: Timothy Chen, Aurora, OH (US); Daniel Albert Haas, Rootstown, OH (US)

(73) Assignee: TECHNICAL CONSUMER PRODUCTS, INC., Aurora, OH (US)

( * ) Notice: Subject to any disclaimer, the term of this patent is extended or adjusted under 35 U.S.C. 154(b) by 0 days.

(21) Appl. No.: 14/594,536

(22) Filed: Jan. 12, 2015

(65) Prior Publication Data

US 2016/0204692 A1 Jul. 14, 2016

(51) Int. Cl.
*H05B 37/02* (2006.01)
*H02M 1/42* (2007.01)
*H02M 3/335* (2006.01)
*H05B 33/08* (2006.01)

(52) U.S. Cl.
CPC ........... *H02M 1/42* (2013.01); *H02M 3/33546* (2013.01); *H05B 33/0815* (2013.01)

(58) Field of Classification Search
CPC ....... H05B 37/029; H05B 37/02; H05B 41/36; H05B 41/24; H05B 41/3925; H05B 41/391; H05B 41/2828; H05B 33/0803; H02M 7/06
USPC ................ 315/224, 247, 291, 307, 294, 250
See application file for complete search history.

(56) References Cited

U.S. PATENT DOCUMENTS

| | | | | |
|---|---|---|---|---|
| 4,672,300 | A | * | 6/1987 | Harper ............... H05B 41/3927 323/222 |
| 4,782,268 | A | * | 11/1988 | Fahnrich ............... H05B 41/28 315/200 R |
| 4,823,250 | A | | 4/1989 | Kolecki et al. |
| 5,404,082 | A | | 4/1995 | Hernandez et al. |
| 5,426,344 | A | * | 6/1995 | Wong ..................... H05B 41/28 315/200 R |
| 5,559,395 | A | | 9/1996 | Venkitasubrahmanian et al. |

(Continued)

OTHER PUBLICATIONS

PCT, International Search Report and Written Opinion, International Application No. PCT/US2016/012257 (Mar. 30, 2016).

(Continued)

*Primary Examiner* — Douglas W Owens
*Assistant Examiner* — Syed M Kaiser
(74) *Attorney, Agent, or Firm* — Thompson Hine LLP

(57) ABSTRACT

A driver circuit for powering a load is disclosed. The driver circuit includes an input for receiving for connection to a source of AC power, and a rectifier for converting the AC power from the input into DC power. The driver circuit also include a voltage bus filter, a high-frequency oscillator for generating a high-frequency AC signal, a resonant driver, a feedback circuit, and a high-frequency DC rectifier. The voltage bus filter smoothens the DC power from the rectifier, and includes at least one capacitor. The resonant driver is in electrical communication with the high-frequency oscillator, and limits a current of the high-frequency AC signal and produces a limited output voltage based on the high-frequency AC signal. The feedback circuit is in electrical communication with the resonant driver and the voltage bus filter, and maintains a charge on the capacitor of the voltage bus filter.

19 Claims, 6 Drawing Sheets

(56) References Cited

U.S. PATENT DOCUMENTS

| | | | | |
|---|---|---|---|---|
| 5,691,606 | A | * | 11/1997 | Moisin .................. H05B 41/28 315/219 |
| 5,914,572 | A | | 6/1999 | Qian et al. |
| 5,925,985 | A | | 7/1999 | Zeng et al. |
| 6,144,169 | A | | 11/2000 | Janczak |
| 6,175,195 | B1 | | 1/2001 | Janczak et al. |
| 6,339,298 | B1 | | 1/2002 | Chen |
| 6,348,767 | B1 | * | 2/2002 | Chen .................... H02M 1/425 315/209 R |
| 6,442,051 | B1 | | 8/2002 | Ryan et al. |
| 6,833,678 | B2 | | 12/2004 | Mayer et al. |
| 6,870,326 | B1 | * | 3/2005 | Stevens ................ H02M 7/529 315/200 R |
| 7,075,251 | B2 | | 7/2006 | Chen et al. |
| 7,750,580 | B2 | * | 7/2010 | Lu ....................... H05B 41/282 315/224 |
| 7,923,941 | B2 | * | 4/2011 | Chen .................... H05B 41/28 315/200 R |
| 2003/0015479 | A1 | * | 1/2003 | Kuennen ................ A61L 2/10 315/224 |
| 2005/0122057 | A1 | | 6/2005 | Chen et al. |
| 2007/0152642 | A1 | * | 7/2007 | Franklin ................ H05B 33/08 323/201 |
| 2008/0074910 | A1 | | 3/2008 | Casteel et al. |
| 2008/0088251 | A1 | * | 4/2008 | Gahalaut ............ H05B 41/2827 315/224 |
| 2010/0097000 | A1 | | 4/2010 | Chen et al. |
| 2010/0225239 | A1 | * | 9/2010 | King .................. H05B 41/2827 315/224 |
| 2010/0237799 | A1 | | 9/2010 | Choi et al. |
| 2011/0101880 | A1 | * | 5/2011 | Ribarich ............ H05B 33/0815 315/250 |
| 2012/0001562 | A1 | * | 1/2012 | Kuennen .................. A61L 2/10 315/224 |
| 2013/0113382 | A1 | | 5/2013 | Kitahara et al. |
| 2013/0187557 | A1 | | 7/2013 | Chen et al. |
| 2015/0342004 | A1 | | 11/2015 | Athalye et al. |

OTHER PUBLICATIONS

US, Non-Final Office Action; U.S. Appl. No. 14/631,175; (Jan. 15, 2016).

U.S. Appl. No. 14/631,175, Final Office Action, May 17, 2016, 25 pages.

U.S. Appl. No. 14/631,175, Advisory Action, Jul. 29, 2016, 7 pages.

U.S. Appl. No. 14/631,175, Interview Summary, Aug. 4, 2016, 5 pages.

PCT/US2016/012255, International Search Report and Written Opinion, Jul. 26, 2016, 21 pages.

* cited by examiner

US 9,531,255 B2

LOW-COST DRIVER CIRCUIT WITH IMPROVED POWER FACTOR

TECHNICAL FIELD

The present disclosure relates generally to a driver circuit for powering a load, and more particularly to a driver circuit having an improved power factor (PF) that includes a feedback circuit for maintaining a charge on a voltage bus filter.

BACKGROUND

Light emitting diode (LED) based lighting systems may offer several energy and reliability advantages over other types of lighting systems such as, for example, incandescent or fluorescent lighting. Thus, LED based lighting systems may be an attractive candidate to replace other existing lighting technologies.

Historically, incandescent light bulbs have had a nearly perfect power factor (PF). In other words, incandescent bulbs typically have a PF of about 1. Those skilled in the art will readily appreciate that electrical devices having a relatively low PF require additional power from the utility, which is also referred to as grid power. Accordingly, high power factor solutions are desirable for LED based lighting system. In particular, it may be especially desirable for an LED based lighting fixture to have a PF of at least 0.7 in order to obtain specific types of energy certifications promulgated by the United States government (e.g., the ENERGY STAR® certification). This is because some potential consumers of lighting products may make purchasing decisions based on whether or not an LED lighting fixture has obtained one or more specific types of energy certifications. Moreover, those skilled in the art will also appreciate there is also a continuing need in the art for a relatively low-cost, reliable driver for an LED lighting fixture as well.

SUMMARY

In one embodiment, a driver circuit for powering a load is disclosed. The driver circuit includes an input for receiving for connection to a source of AC power, and a rectifier for converting the AC power from the input into DC power. The driver circuit also include a voltage bus filter, a high-frequency oscillator for generating a high-frequency AC signal, a resonant driver, a feedback circuit, and a high-frequency DC rectifier. The voltage bus filter smoothens the DC power from the rectifier, and includes at least one capacitor. The resonant driver is in electrical communication with the high-frequency oscillator, and limits a current of the high-frequency AC signal and produces a limited output voltage based on the high-frequency AC signal. The feedback circuit is in electrical communication with the resonant driver and the voltage bus filter, and maintains a charge on the capacitor of the voltage bus filter. The high-frequency DC rectifier is in electrical communication with the resonant driver and rectifies the limited output voltage into a DC output voltage including a substantially constant current for powering the load.

In another embodiment, a driver circuit for powering at least one light emitting diode (LED) in a non-dimming application is disclosed. The driver circuit includes an input for receiving for connection to a source of AC power, and a rectifier for converting the AC power from the input into DC power. The driver circuit also include a voltage bus filter, a high-frequency oscillator for generating a high-frequency AC signal, a resonant driver, a feedback circuit, and a high-frequency DC rectifier. The voltage bus filter smoothens the DC power from the rectifier, and includes at least one capacitor. The resonant driver is in electrical communication with the high-frequency oscillator, and limits a current of the high-frequency AC signal and produces a limited output voltage based on the high-frequency AC signal. The feedback circuit is in electrical communication with the resonant driver and the voltage bus filter. The feedback circuit comprises a capacitor that acts as acts as a charge pump that maintains a charge on the at least one capacitor of the voltage bus filter. The high-frequency DC rectifier is in electrical communication with the resonant driver and rectifies the limited output voltage into a DC output voltage including a substantially constant current for powering the LED.

DETAILED DESCRIPTION

Figure 1:
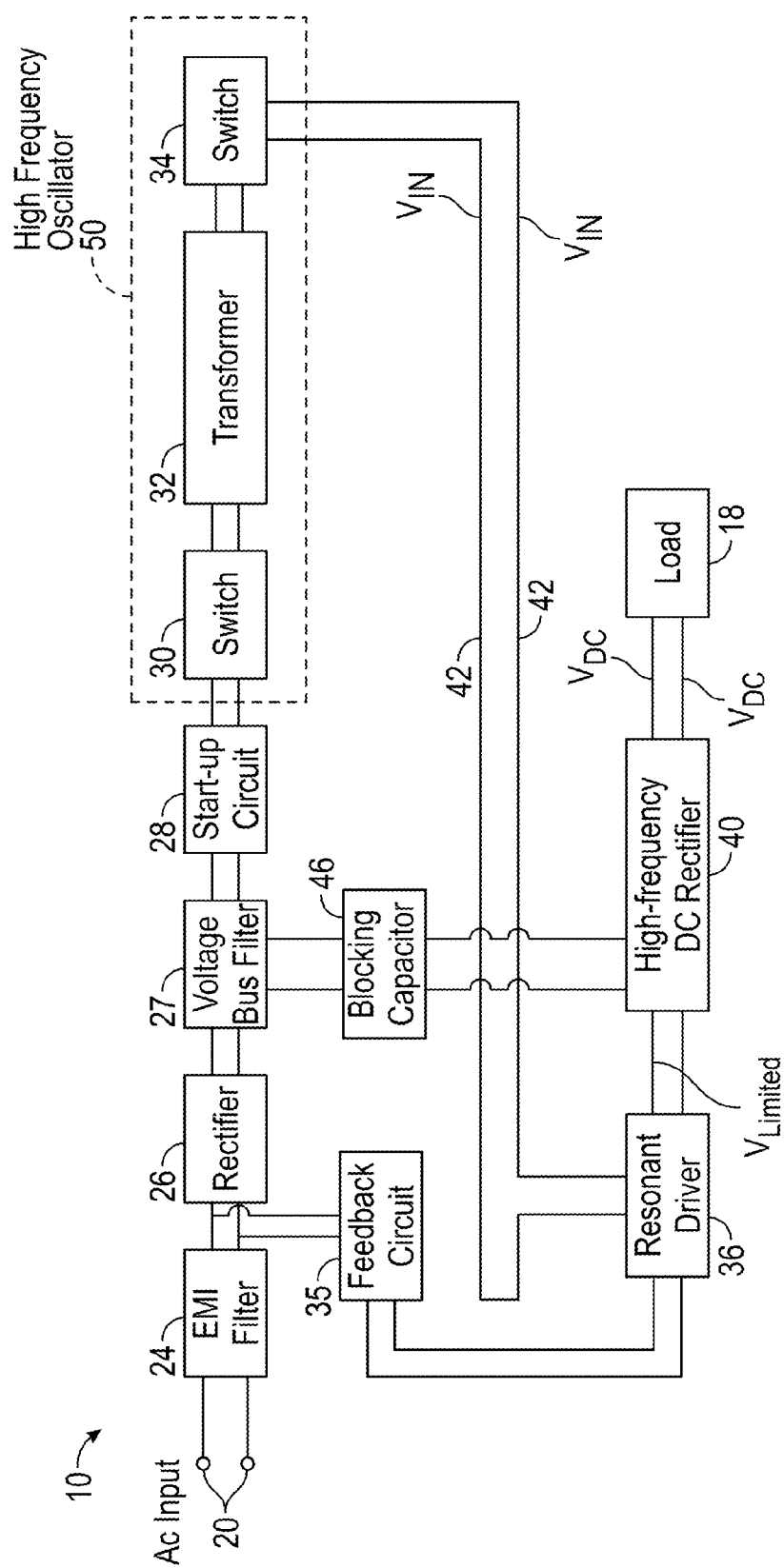
FIG. 1 is an exemplary block diagram of a circuit with an improved power factor (PF) for providing DC current to a load.

The following detailed description will illustrate the general principles of the invention, examples of which are additionally illustrated in the accompanying drawings. In the drawings, like reference numbers indicate identical or functionally similar elements.

FIG. 1 is an exemplary block diagram of a circuit 10 for providing DC current to a load 18. The driver circuit 10 may include a pair of power input lines 20 for connection to a source (not shown) of AC power such as, for example, main power lines at a nominal 120 volts AC. The driver circuit 10 may also include a resistor R1 (shown in FIG. 2), an electromagnetic interference (EMI) filter 24, a rectifier 26, a voltage bus filter 27, a start-up circuit 28, a switch 30, a transformer 32, a switch 34, a feedback circuit 35, a resonant driver circuit 36, a high-frequency DC rectifier 40, and a blocking capacitor 46. As explained in greater detail below, the circuit 10 provides substantially constant DC current to the load 18, while maintaining a relatively high power factor (PF). In one embodiment, the circuit 10 may include a PF of at least 0.7.

Figure 2:
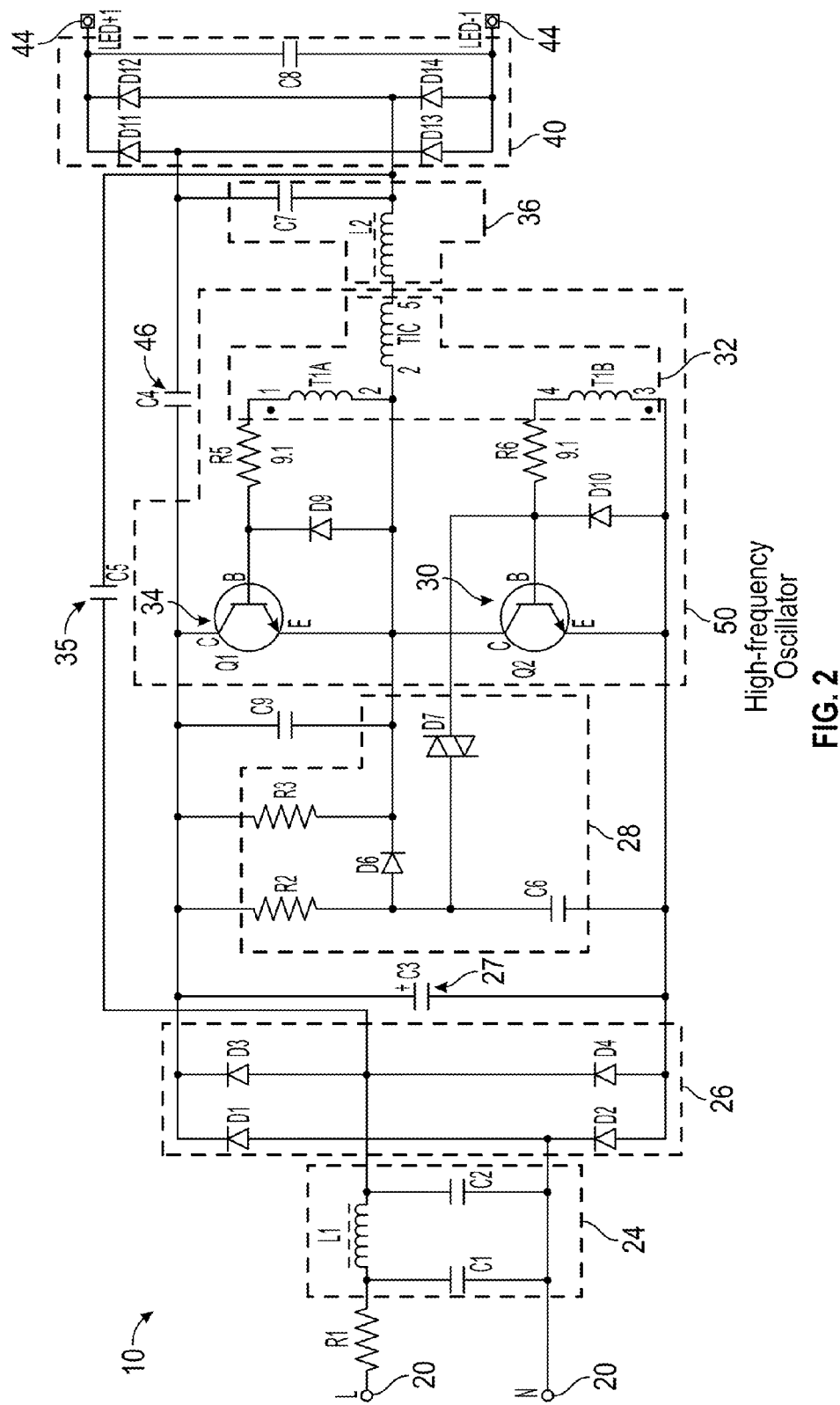
FIG. 2 is an exemplary circuit diagram of the circuit shown in FIG. 1, where a rectifier includes fast recovery diodes.

Referring to FIGS. 1-2, the input lines 20 of the driver circuit 10 may be in electrical communication with the EMI filter 24. In one non-limiting embodiment the EMI filter 24 may include an inductor L1 and capacitors C1 and C2 (shown in FIG. 2). The rectifier 26 may be in electrical communication with the EMI filter 24, and is configured to convert incoming AC power from the EMI filter 24 to a pulsing DC power. In the embodiment as shown in FIG. 2, the rectifier 26 is a high-frequency bridge rectifier including four fast recovery diodes D1, D2, D3, D4. In one embodiment, the fast recovery diodes D1-D4 may have a response time of less than about 150 ns, however it is to be understood that this parameter is merely exemplary in nature, and that other types of fast recovery diodes may be used as well.

The output of the rectifier 26 may be in electrical communication with the voltage bus filter 27. In the exemplary embodiment as shown in FIG. 2, the voltage bus filter 27 may include a capacitor C3. Those of ordinary skill in the art will readily appreciate that the capacitor C3 may be an electrolytic capacitor that acts as a smoothing capacitor. Specifically, the capacitor C3 may be used to smoothen or reduce the amount of ripple in the DC power provided by the rectifier 26 such that relatively steady DC power may be provided to the remaining components within the circuit 10 (i.e., the start-up circuit 28, the switch 30, the transformer 32, the switch 34, the resonant driver circuit 36, and the high-frequency DC rectifier 40). As explained in greater detail below, the feedback circuit 35 may be used to create a charge on the capacitor C3. Maintaining a charge on the capacitor C3 further smoothens the DC power provided by the rectifier 26, which in turns improves the PF of the circuit 10.

Continuing to refer to both FIGS. 1 and 2, the voltage bus filter 27 may be in electrical communication with the start-up circuit 28. The start-up circuit 28 may include resistors R2 and R3, diode D6, diac D7, and capacitor C6. The diac D7 is a diode that conducts current only after a breakover voltage, $V_{BO}$, has been reached. During initial start-up of the circuit 10, the capacitor C6 may be charged until the diac D7 reaches the breakover voltage $V_{BO}$. Once the breakover voltage is reached, the diac D7 may start to conduct current. Specifically, the diac D7 may be connected to and sends current to the switch 30. Once the diac D7 attains the breakover voltage $V_{BO}$, the diode D6 may be used to discharge the capacitor C6 and to prevent the diac D7 from firing again.

As seen in FIG. 2, the circuit 10 may include a lower switch 30 (labelled Q2) and an upper switch 34 (labelled Q1) connected in a cascade arrangement. Referring to both FIGS. 1 and 2, the resistor R3 may be used to provide bias to the lower switching element Q2. In the embodiment as shown in FIG. 2, the switching element Q2 is a bipolar junction transistor (BJT). Although a BJT may be a relatively economical and cost-effective component used for switching, those skilled in the art will appreciate that other types of switching elements may be used as well. A diode D10 may be provided to limit negative voltage between a base B and an emitter E of the switching element Q2, which in turn increases efficiency.

The switch 30 may be connected to the transformer 32. As seen in FIG. 2, in an embodiment the transformer 32 includes three windings, T1A, T1B, and T1C. The winding T1A may include an opposite polarity when compared to the winding T1B. This ensures that if the switching element Q2 is turned on, another switching element Q1 will not turn on at the same time.

Referring to FIGS. 1-2, both the switches 30, 32, diodes D9, D10, resistors R5 and R6, and the transformer 32 define a high-frequency oscillator 50. The high-frequency oscillator 50 generates a high-frequency AC signal $V_{IN}$ (shown in FIG. 1). In one embodiment, the high-frequency AC signal $V_{IN}$ may be an AC signal having a frequency of at least about 40 kilohertz (kHz). An output 42 (shown in FIG. 1) of the high-frequency oscillator 50 may be in electrical communication with the resonant driver circuit 36.

Referring to FIG. 2, the upper switching element Q1 may also be a BJT. A diode D9 may be provided to limit negative voltage between a base B and an emitter E of the upper switching element Q1, which in turn increases efficiency. The switch 34 may be used to electrically connect the high-frequency oscillator 50 to the resonant drive circuit 36. In the embodiment as shown in FIG. 2, the resonant drive circuit 36 may include a capacitor C7 connected in series with the winding T1C of the transformer 32. The resonant drive circuit 36 may also include an inductor L2. The resonant drive circuit 36 may be used to limit the current of the high-frequency AC signal $V_{IN}$ received from the high-frequency oscillator 50. The resonant drive circuit 36 also produces a limited output voltage $V_{LIMITED}$ (shown in FIG. 1) based on the high-frequency AC signal $V_{IN}$.

The resonant driver circuit 36 may be in electrical communication with the high-frequency DC rectifier 40. The limited output voltage $V_{LIMITED}$ created by the resonant driver 36 may be sent to the high-frequency DC rectifier 40, and is rectified into a DC output voltage $V_{DC}$ (shown in FIG. 1). The DC output voltage $V_{DC}$ includes a substantially constant current that is supplied to the load 18. In the embodiment as shown in FIG. 2, the high-frequency DC rectifier 40 is a full wave rectifier including four diodes D11-D14 and a filter capacitor C8. The full-wave rectifier may be connected in parallel with the filter capacitor C8. In one embodiment, the diodes D11-D14 may be low voltage diodes. It is to be understood that the full wave rectifier 40 doubles the frequency of limited output voltage $V_{LIMITED}$ from the resonant circuit 36, therefore the filter capacitor C8 may be relatively small in size. For example, in one embodiment, the filter capacitor C8 may be less than one microfarad.

Continuing to refer to FIGS. 1-2, the blocking capacitor 46 may include a capacitor C4. The capacitor C4 is in electrical communication with the rectifier 26, the voltage bus filter 27, and the high-frequency DC rectifier 40. The capacitor C4 may be used for impedance matching and for blocking DC current. Specifically, the capacitor C4 allows for the high-frequency AC signal $V_{IN}$ (shown in FIG. 1) generated by the high-frequency oscillator to flow to the high-frequency DC rectifier 40. The capacitor C4 also blocks the DC output voltage $V_{DC}$ generated by the high-frequency DC rectifier 40 located on the right side of the circuit 10 from flowing back to the rectifier 26. In the embodiment as shown in FIG. 2, the blocking capacitor C4 is located between the rectifier 26 and the high-frequency DC rectifier 40. However, in an alternative embodiment, the blocking capacitor 46 may be connected to the emitter E of the switch 30.

Figure 3:
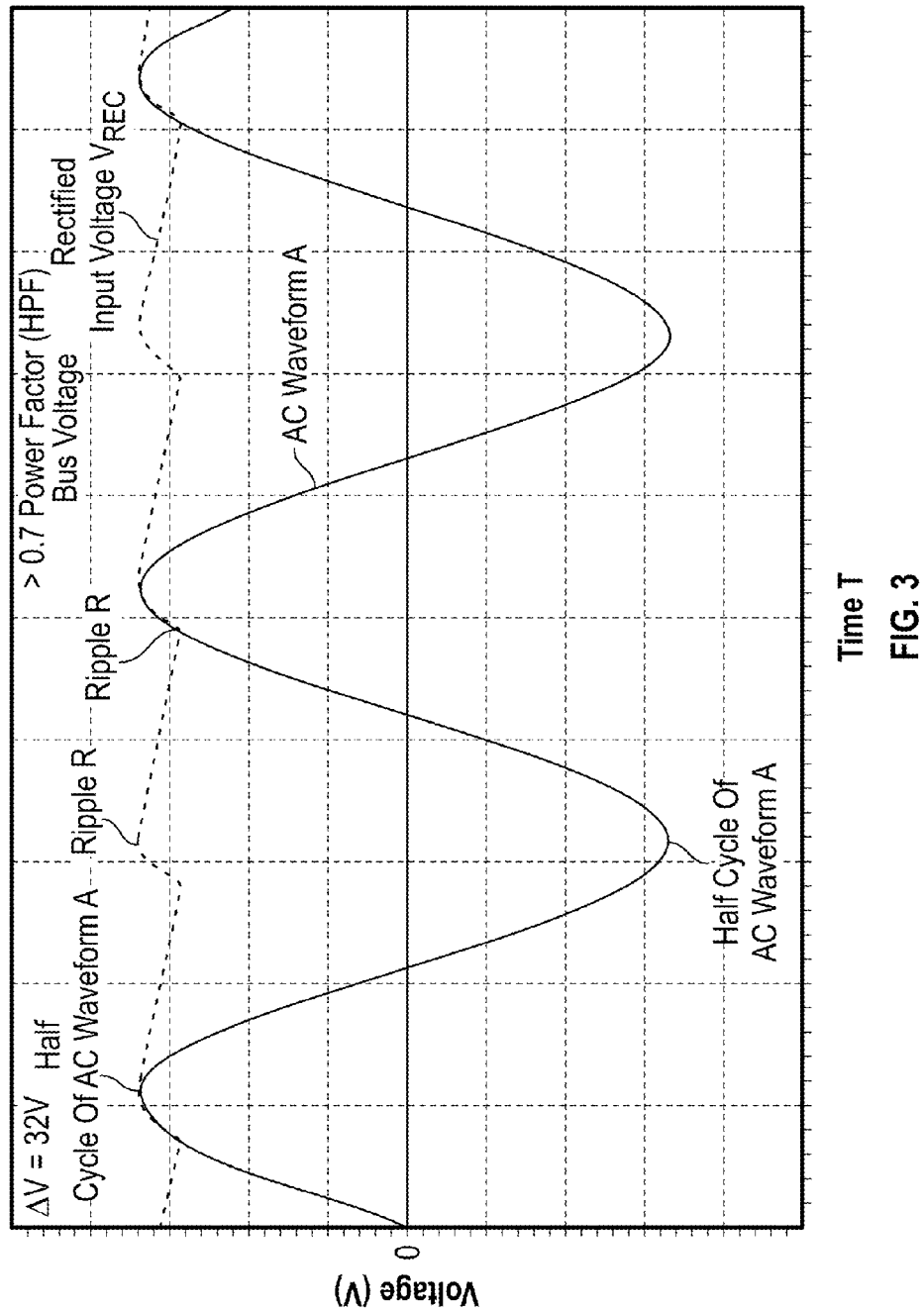
FIG. 3 is an illustration of an exemplary AC waveform at inputs of the circuit shown in FIGS. 1 and 2, as well as a rectified input voltage measured at a voltage bus filter of the circuit.

The feedback circuit 35 may be connected to the circuit 10 between the EMI filter 24 and the rectifier 26. The feedback circuit 35 may also be connected to the high-frequency DC rectifier 40. The feedback circuit 35 includes a capacitor C5, which acts as a charge pump that maintains a charge on the capacitor C3 of the voltage bus filter 27, which in turn increases the PF of the circuit 10. Turning now to FIG. 3, an exemplary illustration of an AC waveform A received by the inputs 20 of the circuit 10 is shown. FIG. 3 also illustrates a rectified input voltage $V_{REC}$ of the circuit 10, which is measured after the rectifier 24 at the capacitor C3 of the voltage bus filter 27. The rectified input voltage $V_{REC}$ is based on the AC waveform received by the inputs 20 of the circuit 10.

Referring to both FIGS. 2 and 3, the rectified input voltage $V_{REC}$ includes ripples R. It is to be understood that the amplitude of the ripples R of the rectified input voltage $V_{REC}$ may be reduced due to the feedback circuit 35 maintaining a charge on the capacitor C3 of the voltage bus filter 27. In other words, maintaining a charge on the capacitor C3 will in turn further smoothen or reduce the amount of ripple in the rectified input voltage $V_{REC}$ through each half cycle of the AC waveform A at the inputs 20 of the circuit 10 (the half cycles of the AC waveform A are labelled in FIG. 3). Moreover, maintaining a charge on the capacitor C3 will also result in increased conduction time of the current at the inputs 20 of the circuit 10. Accordingly, the feedback circuit 35 may improve the overall PF of the circuit 10. For example, in one embodiment, the overall PF of the circuit 10 may be at least 0.7.

Turning back to FIG. 2, in one embodiment, the load 18 may be one or more light emitting diodes (LEDs). For example, in embodiments as shown in FIGS. 2-6 the circuit 10 may include a pair of output terminals 44 that connect to a LED (not shown). In the embodiments as described and illustrated in the figures, the driver circuit 10 is used in a non-dimmable LED application. Although an LED is described, it is to be understood that the load 18 may be any type of device that requires a substantially constant current during operation. For example, in an alternative embodiment, the load 18 may be a heating element.

Figure 4:
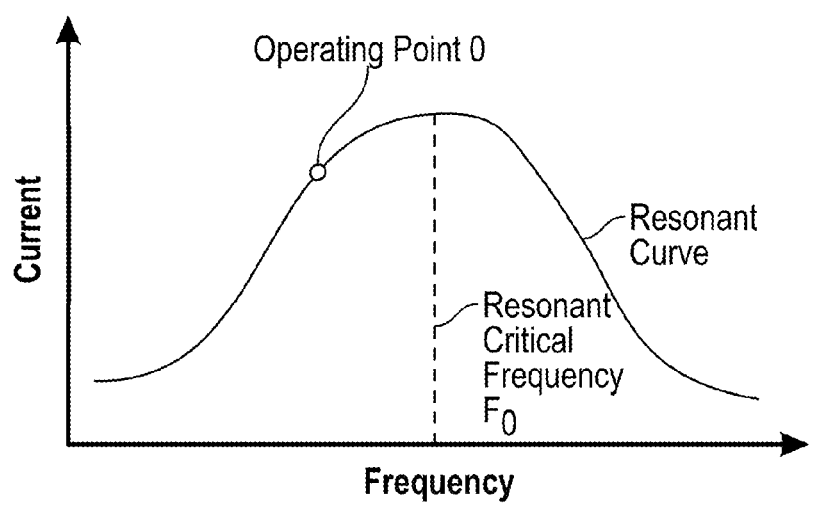
FIG. 4 is an illustration of a resonant curve and an operating point of the resonant driver shown in FIGS. 1 and 2.

FIG. 4 is an illustration of an exemplary resonance curve of the resonant drive circuit 36 shown in FIG. 2. The resonance curve may include an operating point O and a resonant critical frequency $f_o$. The critical frequency $f_o$ is located at a peak of the resonance curve, and the operating point O is located to the left of the critical frequency $f_o$. Referring to both FIGS. 2 and 4, increasing the capacitance of the capacitor C7 or the inductance of the inductor L2 of the resonant driver 36 may shift the critical frequency $f_o$ to the left, and decrease the capacitance of the capacitor C7 or the inductance of the inductor L2 may shift the critical frequency $f_o$ to the right. The frequency of oscillation of the resonance curve may be determined by winding T1C of the transformer 32, resistors R5 and R6, the upper switching element Q1, and the lower switching element Q2. In particular, the frequency of oscillation of the resonance curve may be based upon a number of the turns of the winding T1C of the transformer 32, as well as the storage times of the upper switching element Q1 and the lower switching element Q2.

The inductance of the inductor L2 as well as the capacitance of the capacitors C4 and C7 may be key factors in maintaining acceptable line regulation of the circuit 10. Specifically, as line voltage increases a frequency of operation of the circuit 10 decreases. Moreover, the impedance of the inductor L2 may decrease as the frequency of operation decreases, thereby causing an increase in current that is delivered to the load 18 (FIG. 1). Thus, the inductance of the inductor L2 as well as the capacitance of the capacitors C7 and the capacitor C4 may be selected such that an overall gain of the circuit 10 decreases as the frequency of operation decreases. This in turn may substantially decreases or minimize any increase in current that is delivered to the load 18 as the line voltage increases.

Figure 5:
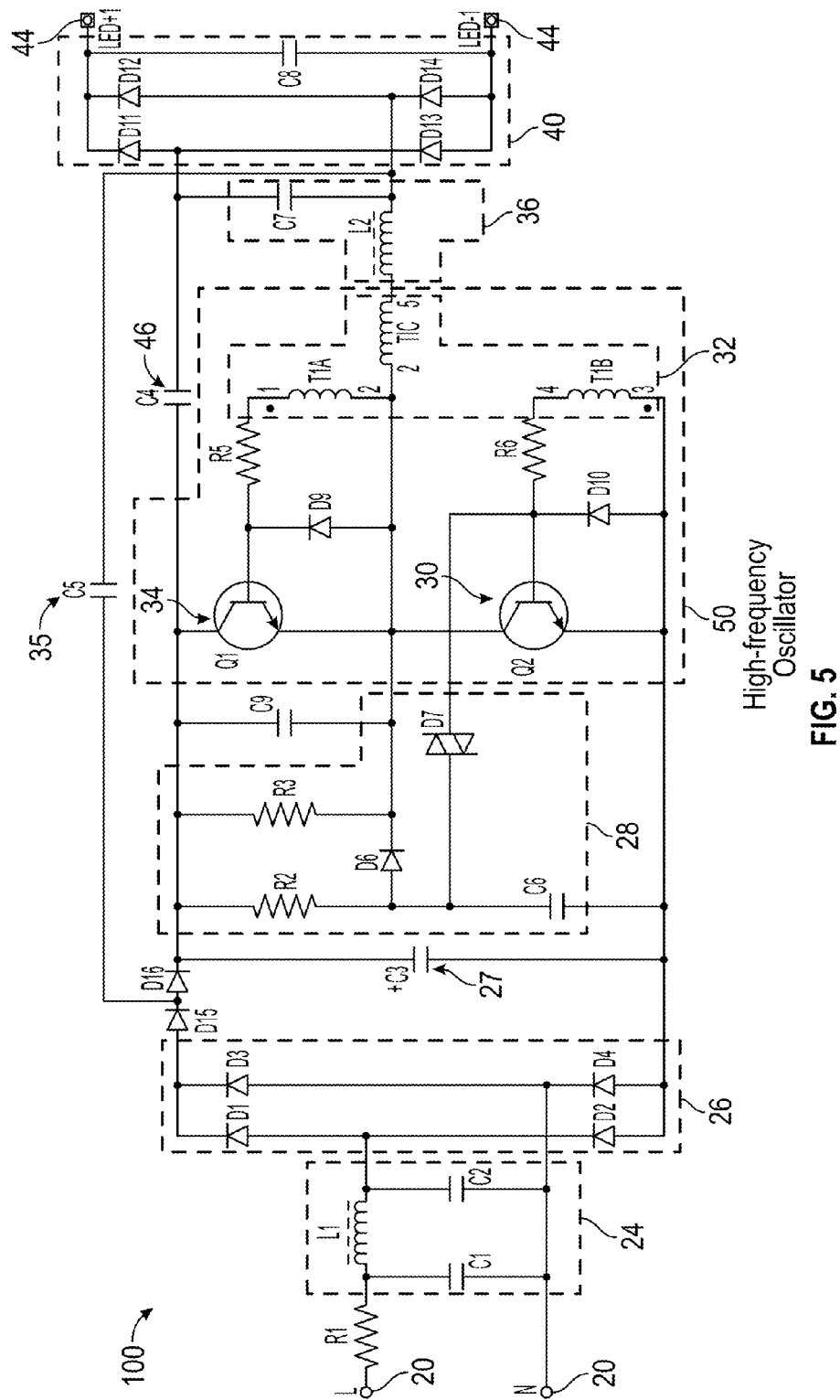
FIG. 5 is an alternative embodiment of the circuit diagram shown in FIG. 2, where the rectifier does not include fast recovery diodes.

FIG. 5 is an illustration of an alternative circuit 100. The circuit 100 includes similar components as the circuit 10 shown in FIG. 2. However, the circuit 100 also includes two additional diodes D15 and D16 that are located after the rectifier 26. In the embodiment as shown in FIG. 5, the diodes D15, D16 are fast recovery diodes. Diode D15 may be located between the rectifier 26 and diode D16. Diode D16 may be located between diode D15 and the high-frequency DC rectifier 40. Since the circuit 100 includes fast recovery diodes D15 and D15, the diodes D1-D4 of the rectifier 26 do not need to be fast recovery diodes as well. In other words, the rectifier 26 is a standard bridge rectifier. Accordingly, the circuit 100 shown in FIG. 5 may result in a reduced number of fast recovery diodes when compared to the circuit 10 shown in FIG. 10.

Figure 6:
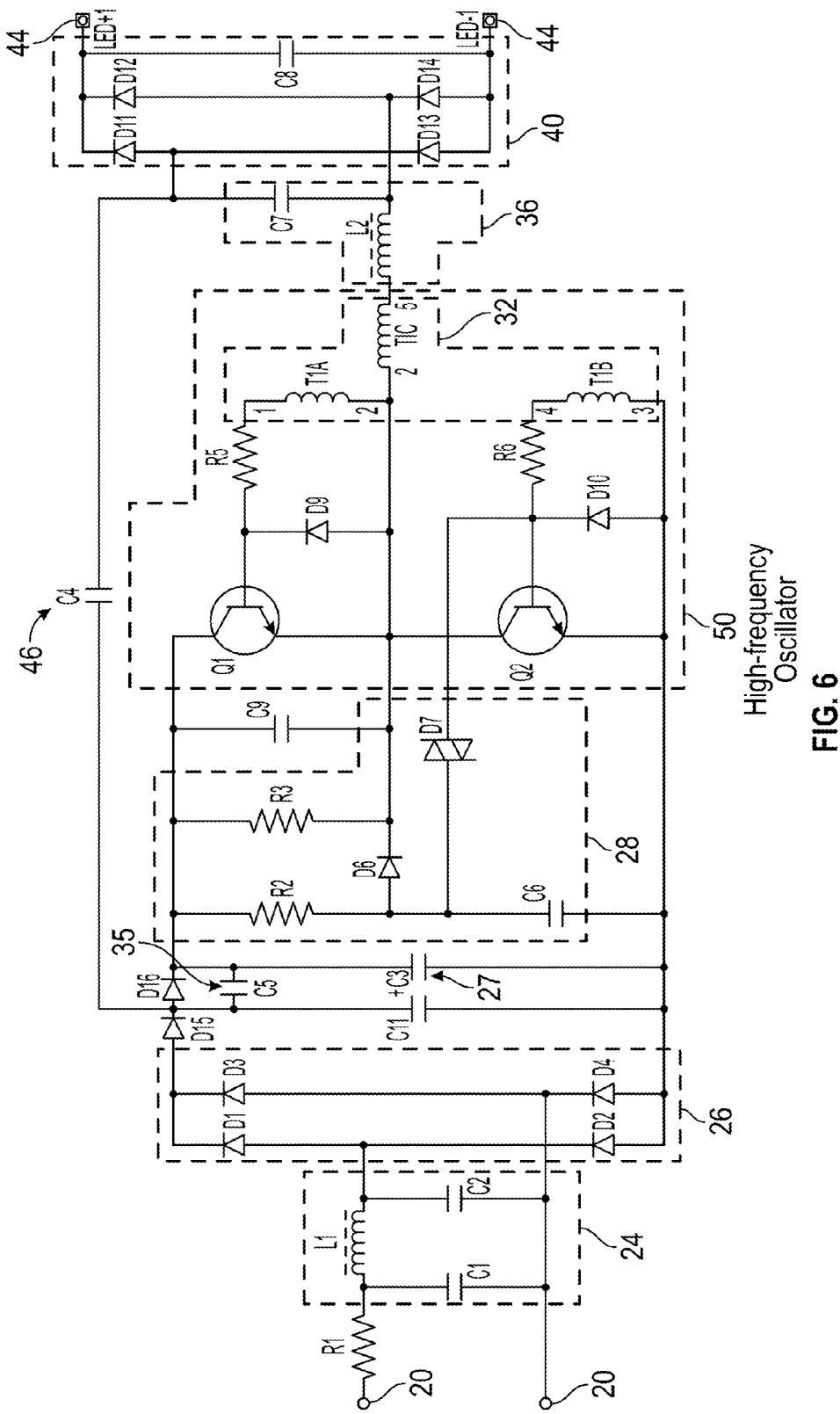
FIG. 6 is another embodiment of the circuit diagram shown in FIG. 5, where the location of a blocking capacitor is modified.

FIG. 6 is yet another embodiment of a circuit 200. The circuit 200 includes similar components as the circuit 100 shown in FIG. 5. However, the location of the blocking capacitor C4 has been modified. Specifically, the blocking capacitor C4 is now connected between diode D15 and the resonant driver circuit 36. Also, the location of the capacitor C5 of the feedback circuit 35 has also been modified. Specifically, the capacitor C5 is now located in parallel with the diode D16. However, capacitor C5 still acts as a charge pump to maintain the charge on the capacitor C3 of the voltage bus filter 27. An additional capacitor C11 has been added to the circuit 200, and is in parallel with the capacitor C3 of the voltage bus filter 27. The capacitor C11 acts as a divider.

The disclosed circuit as illustrated in FIGS. 1-6 and described above provides a relatively low-cost and efficient approach for driving a load, while at the same time providing a relatively high PF (i.e., above 0.7). In particular, the disclosed circuit provides a relatively high PF without the need for active circuitry, which adds cost and complexity to an LED lighting fixture. Furthermore, the disclosed circuit also provides a relatively low-cost and efficient approach for delivering substantially constant current to a load as well. Those skilled in the art will readily appreciate that the disclosed circuit results in fewer components and a simpler design when compared to some types of LED drivers currently available on the market today.

While the forms of apparatus and methods herein described constitute preferred embodiments of this invention, it is to be understood that the invention is not limited to these precise forms of apparatus and methods, and the changes may be made therein without departing from the scope of the invention.

What is claimed is:

1. A driver circuit for powering a load, comprising:
   an input for receiving for connection to a source of AC power, and a rectifier for converting the AC power from the input into DC power;
   a voltage bus filter for smoothening the DC power from the rectifier, the voltage bus filter including at least one capacitor;
   a high-frequency oscillator for generating a high-frequency AC signal;
   a resonant driver in electrical communication with the high-frequency oscillator, the resonant driver limiting a current of the high-frequency AC signal and producing a limited output voltage based on the high-frequency AC signal;
   a feedback circuit in electrical communication with the resonant driver and the voltage bus filter, the feedback circuit maintaining a charge on the at least one capacitor of the voltage bus filter;
   a high-frequency DC rectifier in electrical communication with the resonant driver that rectifies the limited output voltage into a DC output voltage including a substantially constant current for powering the load; and
   a blocking capacitor in electrical communication with the rectifier, the voltage bus filter, and the high-frequency DC rectifier, the blocking capacitor located between the rectifier and the high-frequency DC rectifier, wherein the blocking capacitor allows for the high-frequency AC signal generated by the high-frequency oscillator to flow to the high-frequency DC rectifier and blocks the DC output voltage generated by the high-frequency DC rectifier from flowing back to the rectifier.

2. The driver circuit recited in claim 1, wherein the feedback circuit comprises a capacitor that acts as acts as a charge pump that maintains the charge on the at least one capacitor of the voltage bus filter.

3. The driver circuit recited in claim 1, wherein the rectifier is a high-frequency bridge rectifier including four fast recovery diodes.

4. The driver circuit recited in claim 1, further comprising two fast recovery diodes located after the rectifier.

5. The driver circuit recited in claim 4, wherein the rectifier is a standard bridge rectifier.

6. The driver circuit recited in claim 4, wherein the feedback circuit comprises a capacitor, and wherein the capacitor is connected in parallel with one of the two fast recovery diodes.

7. The driver circuit recited in claim 1, wherein the high-frequency oscillator includes an upper switching element and a lower switching element that are connected in a cascade arrangement.

8. The driver circuit recited in claim 7, wherein the upper switching element and the lower switching element are both bipolar junction transistors (BJTs).

9. The driver circuit recited in claim 1, comprising a start-up circuit including a resistor, a diode, a diac, and a capacitor.

10. The driver circuit recited in claim 9, wherein the capacitor of the start-up circuit is charged during an initial start-up of the driver circuit until the diac reaches a break-over voltage.

11. The driver circuit recited in claim 1, comprising a transformer including a first winding, a second winding, and a third winding, and wherein the first winding and the second winding include opposite polarities.

12. The driver circuit recited in claim 11, wherein the resonant drive circuit includes a capacitor and an inductor, wherein the capacitor is connected in series with the third winding of the transformer, and wherein an inductance of the inductor and a capacitance of the capacitor are selected such that as an overall gain of the driver circuit decreases a frequency of operation also decreases.

13. A driver circuit for powering at least one light emitting diode (LED) in a non-dimming application, comprising:
an input for receiving for connection to a source of AC power, and a rectifier for converting the AC power from the input into DC power;
a voltage bus filter for smoothening the DC power from the rectifier, the voltage bus filter including at least one capacitor;
a high-frequency oscillator for generating a high-frequency AC signal;
a resonant driver in electrical communication with the high-frequency oscillator, the resonant driver limiting a current of the high-frequency AC signal and producing a limited output voltage based on the high-frequency AC signal;
a feedback circuit in electrical communication with the resonant driver and the voltage bus filter, the feedback circuit comprising a capacitor that acts as acts as a charge pump that maintains a charge on the at least one capacitor of the voltage bus filter;
a high-frequency DC rectifier in electrical communication with the resonant driver and rectifies the limited output voltage into a DC output voltage including a substantially constant current for powering the LED; and
a blocking capacitor in electrical communication with the rectifier, the voltage bus filter, and the high-frequency DC rectifier, the blocking capacitor located between the rectifier and the high-frequency DC rectifier, wherein the blocking capacitor allows for the high-frequency AC signal generated by the high-frequency oscillator to flow to the high-frequency DC rectifier and blocks the DC output voltage generated by the high-frequency DC rectifier from flowing back to the rectifier.

14. The driver circuit recited in claim 13, wherein the rectifier is a high-frequency bridge rectifier including four fast recovery diodes.

15. The driver circuit recited in claim 13, further comprising two fast recovery diodes located after the rectifier.

16. The driver circuit recited in claim 15, wherein the rectifier is a standard bridge rectifier.

17. The driver circuit recited in claim 15, wherein the feedback circuit comprises a capacitor, and wherein the capacitor is connected in parallel with one of the two fast recovery diodes.

18. The driver circuit recited in claim 4, wherein an end of the blocking capacitor is directly connected to the driver circuit at one of the two fast recovery diodes, and a remaining end of the blocking capacitor is connected to the resonant driver.

19. The driver circuit recited in claim 15, wherein an end of the blocking capacitor is directly connected to the driver circuit at one of the two fast recovery diodes, and a remaining end of the blocking capacitor is connected to the resonant driver.

* * * * *

UNITED STATES PATENT AND TRADEMARK OFFICE
CERTIFICATE OF CORRECTION

PATENT NO.        : 9,531,255 B2                                     Page 1 of 1
APPLICATION NO.   : 14/594536
DATED             : December 27, 2016
INVENTOR(S)       : Timothy Chen and Daniel Albert Haas It is certified that error appears in the above-identified patent and that said Letters Patent is hereby corrected as shown below:

In the Claims

Claim 2, Column 7, Line 9 reads:
"feedback circuit comprises a capacitor that acts as acts as a"

Should read:
-- feedback circuit comprises a capacitor that acts as a --

Claim 13, Column 8, Line 13 reads:
"circuit comprising a capacitor that acts as acts as a"

Should read:
-- circuit comprising a capacitor that acts as a --

Signed and Sealed this
Twenty-fifth Day of April, 2017

Michelle K. Lee
*Director of the United States Patent and Trademark Office*